United States Patent
Allen

[15] 3,659,931
[45] May 2, 1972

[54] EYE GLASS LENS ADJUSTER
[72] Inventor: Philip J. Allen, 6 Nelson Street, Fredericksburg, Va. 22401
[22] Filed: Aug. 3, 1970
[21] Appl. No.: 60,397

[52] U.S. Cl. ................................................351/41, 351/19
[51] Int. Cl. ..........................................................G02c 1/00
[58] Field of Search ................351/41, 118, 119, 19; 350/72

[56] References Cited

UNITED STATES PATENTS

| | | |
|---|---|---|
| 1,380,166 | 5/1921 | Wall et al...................................351/19 |
| 3,052,161 | 9/1962 | Berend....................351/118 |
| 532,446 | 1/1895 | De Celles....................351/19 |

FOREIGN PATENTS OR APPLICATIONS

| | | |
|---|---|---|
| 78,652 | 3/1894 | Germany................................350/72 |

*Primary Examiner*—David Schonberg
*Assistant Examiner*—Robert L. Sherman

[57] ABSTRACT

An eye glass frame is provided with manually adjustable means for individually moving each lens toward or away from the eyeball to vary the lens-eye separation for maximum comfort and optimum focus.

4 Claims, 4 Drawing Figures

Patented May 2, 1972 3,659,931

INVENTOR
PHILIP J. ALLEN

EYE GLASS LENS ADJUSTER

SUMMARY OF THE INVENTION

In my invention an eye glass frame has a lens carrying eye piece and ear pieces extending rearward therefrom. The eye piece has two lens carrying sections, each with a rotatable pinion wheel engaging a rack secured and extending at right angles to a corresponding lens. By manually rotating the wheel, directly or indirectly, the lens-eye separation can be increased or decreased as desired.

It is well known that many persons wearing glasses are subjected to physiological changes during the day which affect clarity and sharpness of vision as for example when unusual dehydration occurs or heavy liquid intake changes intra-ocular pressure. Such persons can improve clarity and sharpness of vision by varying the separation between each eye and lens. It should also be noted that sudden shifting of vision from short range to distance viewing can also create the need for such adjustment.

My invention can also permit persons who have difficulty in adjusting to bifocals to postpone wearing of same indefinitely by adjusting the lens-eye separation as required.

DETAILED DESCRIPTION OF PREFERRED EMBODIMENTS

Figure 1:
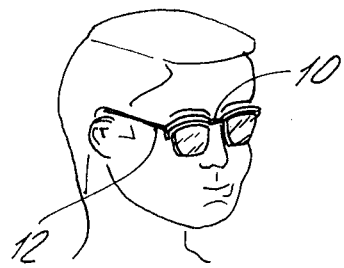
FIG. 1 is a perspective view of my invention in use.
Figure 2:
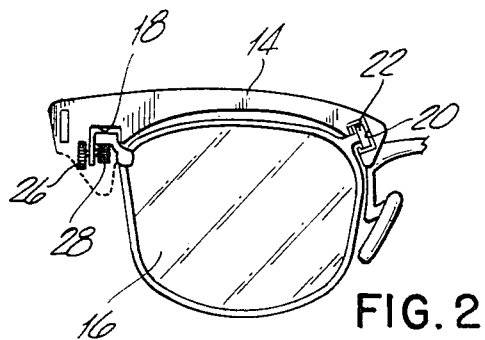
FIG. 2 is a detail front view of a portion of the structure shown in FIG. 1.
Figure 3:
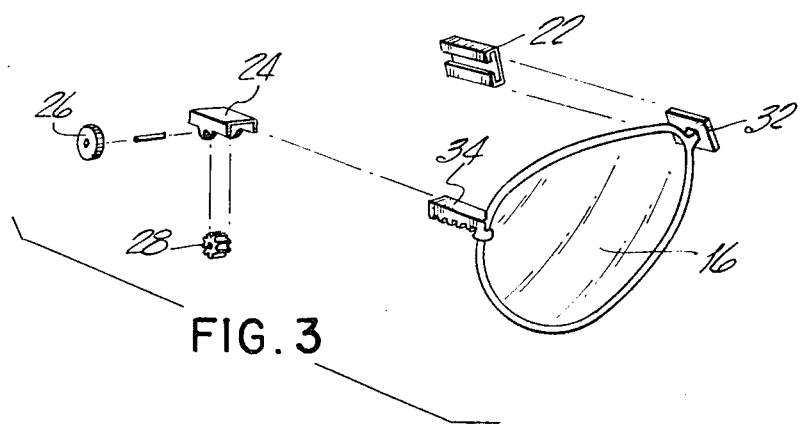
FIG. 3 is an exploded view of the parts shown in FIG. 2.
Figure 4:
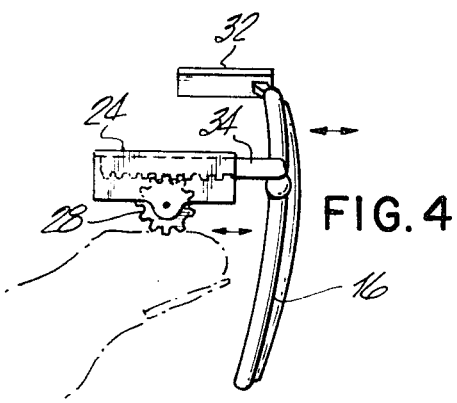
FIG. 4 is a side view of the arrangement of FIG. 2.

Referring now to FIGS. 1–4, eye glasses have an eye piece or frame 10 with ear pieces 12 extending rearward therefrom.

Frame 10 has two eye piece sections 14 each adapted to receive a lens 16. Each section has a curved opening for receiving the lens with recesses 18 and 20 disposed oppositely adjacent the opening. Recess 20 carries a transversely extending track 22. Recess 18 carries a transversely extending track 24 and a spaced apart manually rotatable knob 26 which turns pinion wheel or gear 28.

Each lens 16 has a brace or rail 32 slidably engagable with track 22 and extending at right angles generally to the lens. Each lens also has a rack 34 generally parallel to brace 32, the rack being slidable in track 24 and reciprocated back and forth by suitable rotation of gear 28 engaged therewith.

As a result, the user can adjust the lens-eye separation of either lens-eye pair by suitably rotating the corresponding knob.

A range of one-half inch of total variation in the lens eye separation, one-quarter inch forward and one-quarter inch rearward from the plane of the frame will suffice for most uses, but the range can be varied to a greater or lesser extent as desired.

While I have described my invention with particular reference to the drawings, such is not to be considered as limiting its actual scope.

Having thus described this invention, what is asserted as new is:

1. Eyeglasses comprising a unitary frame adapted to bridge the nose of a wearer, said frame having two lens-receiving openings for disposition closely adjacent to, and on opposite sides of, the nose of a wearer, the optical portion of said eyeglasses consisting of first and second lenses only, said lenses being normally disposed respectively in said two openings in substantially coplanar relation to said frame at positions closely adjacent the eyes of a wearer at opposite sides of the wearer's nose, first and second mounting means extending between said frame and each of said first and second lenses respectively for supporting said first and second lenses individually in their respective frame openings in said substantially coplanar relation, each of said first and second mounting means including manually operable adjustment means for varying the planar position of each lens individually relative to the plane of said frame while maintaining said first and second lenses in substantially parallel planar relation to one another, each of said mounting means and its included adjustment means being operative selectively to vary the position of an associated one of said lenses individually in both forward and rearward directions away from the position wherein said lens is substantially coplanar with said frame to any other desired position between limit positions respectively located forward and rearward of the plane of said frame.

2. The structure of claim 1 wherein each of said first and second mounting means comprises at least one elongated support element attached to an edge of one of said lenses respectively and extending at substantially right angles to the plane of said lens rearwardly of said lens, and an associated track attached to said frame, said elongated support element being in slidable engagement with said track.

3. The structure of claim 1 wherein each of said first and second mounting means comprises a pair of elongated support elements attached to opposing edges of one of said lenses respectively and extending in substantially parallel relation to one another rearwardly of said lens, each of said mounting means further comprising a pair of tracks attached to said frame, said pair of support elements engaging said pair of tracks respectively for slidable movement relative thereto.

4. The structure of claim 3 wherein one of said support elements, in each pair of support elements, is toothed to provide a rack, each of said adjustment means comprising a pinion element rotatably mounted on said frame, each of said pinion elements having one portion thereof in meshing engagement with one of said racks and having another portion thereof manually accessible for rotating said pinion element, independently of rotation of the other of said pinion elements, to effect movement of its associated rack, the other support element in each pair of support elements being freely slidable relative to its associated track upon rotation of said pinion element.

* * * * *